US012613905B2

(12) United States Patent
Kim et al.

(10) Patent No.: US 12,613,905 B2
(45) Date of Patent: Apr. 28, 2026

(54) DEVICE AND METHOD FOR EDITING MEDIA FILE

(71) Applicant: SAMSUNG ELECTRONICS CO., LTD., Suwon-si (KR)

(72) Inventors: Hongseob Kim, Suwon-si (KR); Chulhee Kim, Suwon-si (KR); Wonki Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 18/067,236

(22) Filed: Dec. 16, 2022

(65) Prior Publication Data

US 2023/0161807 A1 May 25, 2023

Related U.S. Application Data

(63) Continuation of application No. PCT/KR2022/014421, filed on Sep. 27, 2022.

(30) Foreign Application Priority Data

Nov. 19, 2021 (KR) ........................ 10-2021-0160404
Dec. 2, 2021 (KR) ........................ 10-2021-0170760

(51) Int. Cl.
*G06F 16/48* (2019.01)

(52) U.S. Cl.
CPC .................................. *G06F 16/489* (2019.01)

(58) Field of Classification Search
None
See application file for complete search history.

(56) References Cited

U.S. PATENT DOCUMENTS 8,954,477 B2 2/2015 Agnoli et al.
9,311,375 B1 * 4/2016 Naik ..................... G06F 16/275
(Continued)

FOREIGN PATENT DOCUMENTS

CN 104980805 A 10/2015
JP 2005-215894 A 8/2005
(Continued)

OTHER PUBLICATIONS

International Search Report dated Jan. 12, 2023 for PCT/KR2022/014421.
(Continued)

*Primary Examiner* — Khanh B Pham
*Assistant Examiner* — Navneet Gmahl
(74) *Attorney, Agent, or Firm* — NIXON & VANDERHYE P.C.

(57) ABSTRACT

A method of editing a media file may include: identifying a first header including metadata and media data including one or more media samples from a media file to be edited; generating a second header based on the first header; modifying the second header based on modification information; determining a location of the second header to be after the media data when a location of the first header is before a location of the media data; determining the location of the second header based on the location of the first header when the location of the first header is after the location of the media data; and/or extracting metadata of the second header in a media file information extraction process.

21 Claims, 9 Drawing Sheets

(56) References Cited

U.S. PATENT DOCUMENTS

| | | | | |
|---|---|---|---|---|
| 9,426,543 | B1 * | 8/2016 | Li | H04N 21/8586 |
| 9,922,682 | B1 * | 3/2018 | Bodinet | G11B 27/034 |
| 10,079,710 | B2 * | 9/2018 | Dahl | H04L 65/765 |
| 2004/0231004 | A1 * | 11/2004 | Seo | H04N 21/8456 |
| | | | | 348/E7.071 |
| 2005/0165857 | A1 * | 7/2005 | Naka | G11B 27/034 |
| 2006/0143235 | A1 * | 6/2006 | Takaku | G11B 27/34 |
| 2009/0049099 | A1 * | 2/2009 | Cho | G11B 27/034 |
| 2009/0062944 | A1 * | 3/2009 | Wood | G06F 16/48 |
| | | | | 700/94 |
| 2009/0319679 | A1 * | 12/2009 | Okada | H04L 67/06 |
| | | | | 709/230 |
| 2010/0169390 | A1 | 7/2010 | Park et al. | |
| 2012/0054370 | A1 | 3/2012 | Tsubakihara | |
| 2013/0007223 | A1 * | 1/2013 | Luby | H04N 21/234327 |
| | | | | 709/219 |
| 2014/0082657 | A1 * | 3/2014 | McReynolds | H04N 21/835 |
| | | | | 725/31 |
| 2014/0301716 | A1 * | 10/2014 | Carignan | G11B 27/3027 |
| | | | | 386/248 |

| | | | | |
|---|---|---|---|---|
| 2016/0004601 | A1 * | 1/2016 | Ahn | G06F 11/1451 |
| | | | | 707/645 |
| 2016/0335258 | A1 * | 11/2016 | Kindig | G06F 16/4387 |
| 2019/0327505 | A1 * | 10/2019 | Schwimmer | H04N 21/23106 |
| 2020/0413160 | A1 * | 12/2020 | Yin | H04N 21/4402 |
| 2021/0334547 | A1 * | 10/2021 | Cohen-Tidhar | G06V 10/82 |
| 2022/0286746 | A1 * | 9/2022 | Yagasaki | H04N 21/23614 |
| 2023/0030942 | A1 * | 2/2023 | Truax | G06Q 30/0276 |

FOREIGN PATENT DOCUMENTS

| | | |
|---|---|---|
| JP | 2009-271635 A | 11/2009 |
| JP | 2021-166338 A | 10/2021 |
| KR | 10-2008-0006295 A | 1/2008 |
| KR | 10-1036768 | 5/2011 |
| KR | 10-2012-0019643 A | 3/2012 |
| KR | 10-1316579 | 10/2013 |

OTHER PUBLICATIONS

Extended European Search Report dated Oct. 15, 2024 for EP Application No. 22895832.8.

* cited by examiner

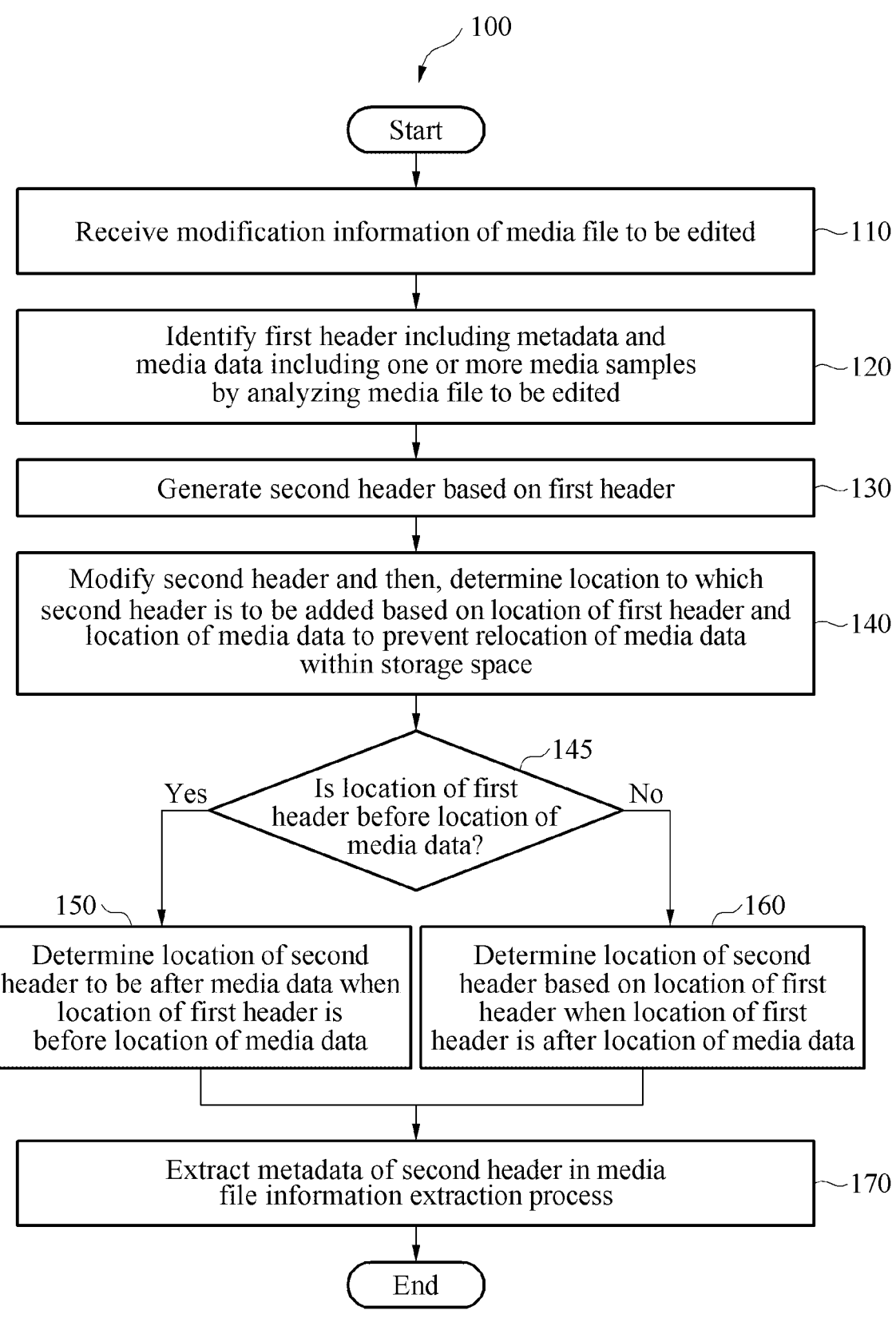

_100_

Start

Receive modification information of media file to be edited    ~110

Identify first header including metadata and
media data including one or more media samples
by analyzing media file to be edited    ~120

Generate second header based on first header    ~130

Modify second header and then, determine location to which
second header is to be added based on location of first header and
location of media data to prevent relocation of media data
within storage space    ~140

_145_
Is location of first
header before location of
media data?

Yes    No 150    160

Determine location of second
header to be after media data when
location of first header is
before location of media data Determine location of second
header based on location of first
header when location of first
header is after location of media data Extract metadata of second header in media
file information extraction process    ~170

End

FIG. 1

DEVICE AND METHOD FOR EDITING MEDIA FILE

CROSS-REFERENCE TO RELATED APPLICATIONS

This application is a continuation of International Application No. PCT/KR2022/014421 designating the United States, filed on Sep. 27, 2022, in the Korean Intellectual Property Receiving Office and claiming priority to Korean Patent Application No. 10-2021-0160404, filed on Nov. 19, 2021, and Korean Patent Application No. 10-2021-0170760, filed on Dec. 2, 2021 in the Korean Intellectual Property Office, the disclosures of which are hereby incorporated by reference herein in their entireties.

BACKGROUND

1. Field

The disclosure relates to a device and method for editing a media file.

2. Description of Related Art

An electronic device may be used to edit files. For example, an electronic device may be used to edit media files. The media files may include photo files, music files, document files, audio files, and/or video files. There is increasing interest in technology for editing media files to provide a function of efficiently editing a media file in an electronic device.

SUMMARY

A media file may include elements of which locations and order within the file are not fixed according to the attributes of a file format. For example, a header may be located in the front of a media file, and media data may follow the header. In this case, when the size of the header changes, the location of the entire media data may need to be changed as much as the change. Relocating the entire media data which occupies a large capacity in the media file may require a lot of time in the process of editing the media file and increase the amount of computation.

According to various example embodiments, it is possible to prevent, or reduce the likelihood of, the relocation of media data by generating and modifying a new header.

According to various example embodiments, it is possible to provide a user with a file restoration function since the original header is present even if a media file is modified.

According to various example embodiments, it is possible to prevent an editing history of a media file from being shared according to a selection of a user in sharing the media file.

According to an example embodiment, an electronic device may include: at least one processor; and a memory configured to store instructions executable by the at least one processor. The memory may be configured to store a media file and instructions for editing the media file, and the processor for executing the instructions may be configured to identify a first header including metadata and media data including at least one media sample from a media file to be edited, generate a second header based on the first header, modify the second header based on modification information, determine a location of the second header to be after the media data when a location of the first header is before a location of the media data, determine the location of the second header based on the location of the first header when the location of the first header is after the location of the media data, and extract metadata of the second header in a media file information extraction process.

According to an example embodiment, a method of editing a media file may include: identifying a first header including metadata and media data including one or more media samples from a media file to be edited; generating a second header based on the first header; modifying the second header based on modification information; determining a location of the second header to be after the media data when a location of the first header is before a location of the media data; determining the location of the second header based on the location of the first header when the location of the first header is after the location of the media data; and extracting metadata of the second header in a media file information extraction process.

According to various example embodiments, a method of editing a media file may prevent, or reduce the likelihood of, the relocation of media data, thereby reducing the amount of computation needed for file editing and the complexity of implementation.

According to various example embodiments, a method of editing a media file may prevent, or reduce the likelihood of, the relocation of media data, thereby skipping an operation needed for media data relocation and reducing modification of a header including location information of the media data.

According to various example embodiments, a method of editing a media file may provide a user with editing history information of a media file since the original header is present even if the media file is modified.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 1 is a flowchart illustrating a method of editing a media file according to an example embodiment;

DETAILED DESCRIPTION

Figure 2:
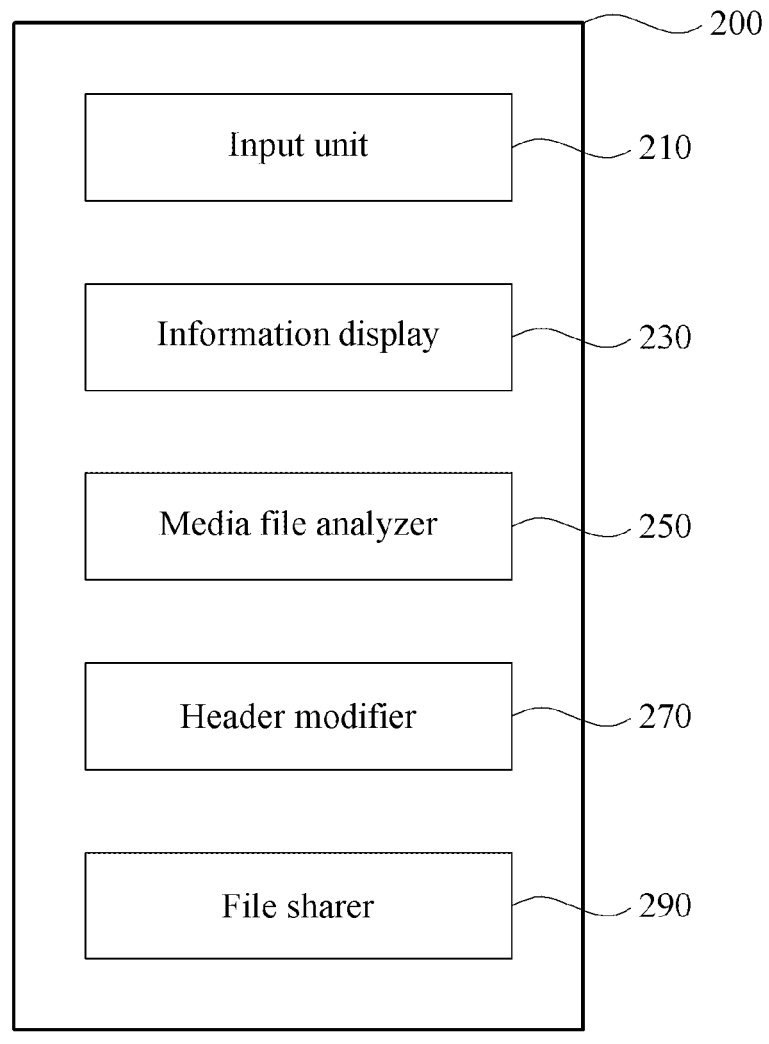
FIG. 2 is a block diagram of a media file editing module according to an example embodiment.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, at least a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms used herein including technical or scientific terms have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. In the drawings, like reference numerals are used for like elements.

FIG. 1 is a flowchart 100 illustrating a method of editing a media file according to an example embodiment. The method of editing a media file shown in FIG. 1 is merely an example, and the order of some operations shown in FIG. 1 may be changed for editing a media file.

According to an example embodiment, a processor (e.g., a processor 920 of FIG. 9) may receive modification information of a media file to be edited, in operation 110. According to an example embodiment, the processor 920 may receive the modification information of the media file to be edited, which is generated based on a user input signal. According to an example embodiment, the media file may be a file containing data (e.g., metadata and media data) that can be read, written, and/or edited by an electronic device 901. The file may include, for example, an image file, an audio file, a video file, and/or a document file. According to an example embodiment, the media file may include one or more boxes. According to an example embodiment, a box may be a data block, data frame, or object including media data and/or metadata related to the media data. The boxes may form a hierarchical structure, and data may be classified according to the hierarchical structure such that the media file may have a format appropriate for storing and transmitting a large volume of media data. According to an example embodiment, the media file may have a structure that is easy for the processor 920 to access the media file.

According to an example embodiment, when the media file is an ISO/IEC base media file format (ISOBMFF) file, the media file may include a ftyp box, a moov box, and a mdat box. The ftyp box (file type box) may provide a file type or compatibility related information of the media file. According to an example embodiment, the moov box (movie box) may be a box containing metadata for the media data of the media file. The moov box may serve as a container for pieces of metadata. According to an example embodiment, the mdat box (media data box) may be a box containing at least one actual media data of the media file. The at least one media data may include at least one media sample (e.g., audio samples and/or video samples), and the mdat box may serve as a container for containing the media samples. Each embodiment herein may be used in combination with any other embodiment herein.

According to an example embodiment, the media file to be edited may be a media file which is a target of editing. The processor 920 may receive a selection input signal for a predetermined media file from a user. The processor 920 may determine the media file to be edited based on the selection input signal.

According to an example embodiment, the modification information of the media file to be edited may include information necessary to modify the media file to be edited. The modification information of the media file to be edited may include at least one of modification information of the metadata or modification information of the media data. According to an example embodiment, the modification information of the metadata may include information necessary to modify the metadata. For example, the modification information of the metadata may include information for modifying at least a portion of a created time, a capturing location, capturing device information, attribute information, track information, and/or play section information of the media file included in the metadata. The processor 920 may receive a metadata modification signal from the user. The processor 920 may modify the metadata included in the header based on the modification information of the metadata. The processor 920 may modify the metadata included in the header based on the modification information of the metadata, and maintain the media data as it is. According to an example embodiment, the modification information of the media file to be edited may include modification information of the media data. The processor 920 may modify the media data based on the modification information of the media data. For example, the processor 920 may modify one or more media samples included in the media data based on the modification information of the media data.

According to an example embodiment, the processor 920 may identify the first header including the metadata and the media data including one or more media samples from the media file to be edited, in operation 120. According to an example embodiment, the header may be a region including the metadata in the media file. According to an example embodiment, the header may include a moov box when the media file is an ISOBMFF file. According to an example embodiment, the first header may include a header in a state before the processor 920 modifies the media file based on the modification information. According to an example embodiment, the media data may include data including one or more media samples. The media samples may include, for example, audio samples and/or video samples. According to an example embodiment, the media data may include a mdat box when the media file is an ISOBMFF file. According to an example embodiment, the processor 920 may analyze a structure of the media file from the media file to be edited. The processor 920 may identify the location of the header and/or the location of the media data, included in the media file, by analyzing the structure of the media file. In addition, the processor 920 may identify the location of data to be modified within the media file by analyzing the structure of the media file.

According to an example embodiment, the processor 920 may generate a second header based on the first header, in operation 130. According to an example embodiment, the second header may include a header that is newly added to the media file. According to an example embodiment, in a media file editing process, the first header may be a header that existed before the media file is edited, and the second header may be a header that is newly generated in the media file editing process. According to an example embodiment, the processor 920 may generate the second header by copying at least a portion of the first header. According to an example embodiment, the processor 920 may modify only the second header based on the modification information and maintain the first header as it is without modification.

According to an example embodiment, the processor 920 may modify the second header based on the modification information, in operation 140. According to an example embodiment, the processor 920 may determine a location at which the second header modified based on the modification information is to be stored. According to an example embodiment, the processor 920 may determine a location to which the second header is to be added based on the location of the first header and the location of the media data to prevent, or reduce the likelihood of, the relocation of the media data within a storage space. A specific embodiment of the process of adding the second header will be described later with reference to FIG. 4.

According to an example embodiment, the processor 920 may determine a relative location of the first header based on the location of the media data. For example, the processor 920 may determine whether the first header precedes or follows the media data. According to an example embodiment, the processor 920 may determine whether the location of the first header is before the location of the media data, in operation 145.

According to an example embodiment, when the location of the first header is before the location of the media data, the processor 920 may determine the location of the second header to be after the media data, in operation 150. In operation 170, the processor may extract metadata of the second header in a media file information extraction process. According to an example embodiment, in the media file, the header may be located in the front, and the media data may be located after the header. In this case, when the size of the header changes as the header is modified by the processor 920, the location at which the media data is stored may change, and thus, both the location information of the media data included in the header and/or the location of the media data may need to be changed. Accordingly, to prevent, or reduce the likelihood of, the relocation of the media data, the processor 920 may generate a new header and modify the new header based on the modification information. In various embodiments, a newly generated header may be the second header, and an existing header may be the first header. The processor 920 may add the second header after the media data file. In this case, the order of regions included in the media file may be "first header→media data→second header". Through this, the processor 920 may modify the header without relocating the media data within the storage space.

According to an example embodiment, when the location of the first header is after the location of the media data, the processor 920 may determine the location of the second header based on the location of the first header, in operation 160. According to an example embodiment, the processor 920 may locate the second header before the first header or locate the second header after the first header based on the location of the first header.

According to an example embodiment, when the location of the first header is after the location of the media data, the processor 920 may determine the location of the second header to be after the first header. According to an example embodiment, in the media file, the header may be located in the front, and the media data may be located after the header. According to an example embodiment, in a media file, media data may be located in the front, and a header may be located after the media data. For example, the order of regions included in the media file may be "media data-→header". As another example, the order of regions included in the media file may be "header→media data-→header". In this case, a file structure may be one in which the order of regions included in the original media file was "header→media data", but a new header is added by modifying the header. Since there are two headers, the existing header may be declared as a free space so as to be excluded from file parsing. Therefore, the regions included in the media file may be "header (free space)→media data-→header". According to an example embodiment, when the first header, which is the existing header, is present after the media data, the processor 920 may add the second header, which is a new header, after the first header. Through this, it is possible to prevent, or reduce the likelihood of, the relocation of the media data. For example, the structure of the media file to which the second header is added may be "media data→first header (free space)→second header". As another example, the structure of the media file to which the second header is added may be "first header (free space) →media data→first header (free space)→second header". The foregoing is merely an example, and various embodiments of the present disclosure are not limited thereto.

According to an example embodiment, the processor 920 may determine the location of the second header to be before the first header. According to an example embodiment, the processor 920 may locate the second header after the media data and locate the first header after the second header. In this case, the structure of the media file to which the second header is added may be "media data→second header→first header (free space)".

According to an example embodiment, the processor 920 may locate another box between the second header and the first header. For example, the processor 920 may locate the second header after the media file, locate the another box after the second header, and locate the first header after the another box. In this case, the structure of the media file may be "media data→second header→another box→first header (free space)". According to an example embodiment, the another box located between the first header and the second header may be one box or a plurality of boxes. As another example, the processor 920 may locate the first header after the media file, locate the another box after the first header, and locate the second header after the another box. In this case, the structure of the media file may be "media data-→first header (free space)→another box→second header".

According to an example embodiment, when the location of the first header is after the location of the media data, the processor 920 may replace the first header with the second header. For example, there may be a case where it is not desired to leave the editing history information in the media file. In this case, the processor 920 may receive a selection input signal of a user and replace the first header with the second header. In this case, metadata included in the first header may be deleted, and thus, editing history information may not be generated.

According to an example embodiment, when the location of the first header is after the location of the media data, the processor 920 may modify the first header based on the modification information, rather than generating the second header.

According to an example embodiment, the processor 920 may extract metadata of the second header in the media file information extraction process. According to an example embodiment, the processor 920 may extract only the metadata of the second header and may not extract the metadata of the first header in the media file information extraction process. According to an example embodiment, the media file information extraction process may include a process of extracting metadata included in the media file. According to an example embodiment, the media file information extraction process may include a file parsing process.

According to an example embodiment, the processor 920 may change the first header to a free space to exclude the first header from the file parsing process, in operation 170. According to an example embodiment, the file parsing process may include a process of interpreting data included in the media file. According to an example embodiment, the processor 920 may extract the metadata and/or the media data from the media file through the file parsing process. For example, the processor 920 may extract audio samples and/or video samples (or video frames) included in the media data through the file parsing process. According to an example embodiment, the processor 920 may change the first header to a free space. For example, when the media file is an ISOBMFF file, the first header may be a moov box. The processor 920 may change the moov box to a free space. When the moov box is changed to a free space, the box may be excluded, and another box may be parsed in the file parsing process. By changing the existing first header to a free space, the processor 920 may prevent or reduce a situation in which the first header and the second header are parsed at the same time such that duplicate metadata are generated. When the first header and the second header are parsed at the same time such that duplicate metadata are generated, there may occur confusion in data processing by the processor 920.

According to an example embodiment, an electronic device may include at least one processor and a memory configured to store instructions executable by the at least one processor. The memory may store a media file and instructions for editing the media file, and the processor for executing the instructions may perform identifying a first header including metadata and media data including one or more media samples from a media file to be edited, generating a second header based on the first header, modifying the second header based on modification information, determining a location of the second header to be after the media data when a location of the first header is before a location of the media data, determining the location of the second header based on the location of the first header when the location of the first header is after the location of the media data, and extracting metadata of the second header in a media file information extraction process.

According to an example embodiment, the modification information of the media file to be edited may include at least one of modification information of the metadata or modification information of the media data.

According to an example embodiment, the metadata may include at least one of a created time, an edited time, a capturing location, capturing device information, attribute information, track information, or play section information of the media file.

According to an example embodiment, the generating of the second header based on the first header may include generating the second header by copying the first header.

According to an example embodiment, the modifying of the second header may include modifying at least one of a created time, an edited time, a capturing location, capturing device information, attribute information, or track information of the media file included in the second header based on the modification information of the media file to be edited.

According to an example embodiment, the modifying of the second header may include modifying play section information included in the second header based on the modification information of the media file to be edited.

According to an example embodiment, the extracting of the metadata of the second header may include changing the first header to exclude the first header from a file parsing process.

The processor for executing the instructions may further perform determining a media file to be transmitted, wherein the determining of the media file to be transmitted may include determining whether the second header is present in the media file by analyzing the media file, and determining whether to include the first header in the media file to be transmitted based on a signal indicating whether to remove the first header, when the second header is present.

According to an example embodiment, the determining of the media file to be transmitted may include changing data included in the first header to a predetermined value, when the first header is to be removed.

According to an example embodiment, the determining of the media file to be transmitted may include determining a media file including the first header, the second header, and the media data, to be the media file to be transmitted for sharing editing history information, when the first header is not to be removed.

According to an example embodiment, the determining of the media file to be transmitted may include removing, from the media data, at least one portion of the media samples corresponding to a play section removed based on the modification information, and determining a media file including the media data from which the at least one portion of the media samples is removed, to be the media file to be transmitted.

The processor for executing the instructions may further perform restoring a media file, wherein the restoring of the media file may include receiving restoration information of the media file, identifying the location of the first header based on location information of the first header included in the second header, converting the first header into a file parsable form, and removing the second header based on whether to maintain the editing history information of the media file.

According to an example embodiment, a method of editing a media file may include identifying a first header including metadata and media data including one or more media samples from a media file to be edited; generating a second header based on the first header, modifying the second header based on modification information, determining a location of the second header to be after the media data when a location of the first header is before a location of the media data; determining the location of the second header based on the location of the first header when the location of the first header is after the location of the media data, and extracting metadata of the second header in a media file information extraction process.

According to an example embodiment, the modification information of the media file to be edited may include at least one of modification information of the metadata or modification information of the media data.

According to an example embodiment, the metadata may include at least one of a created time, an edited time, a capturing location, capturing device information, attribute information, track information, or play section information of the media file.

According to an example embodiment, the generating of the second header based on the first header may include generating the second header by copying the first header.

According to an example embodiment, the modifying of the second header may include modifying at least one of a created time, an edited time, a capturing location, capturing device information, attribute information, or track information of the media file included in the second header based on the modification information of the media file to be edited.

According to an example embodiment, the modifying of the second header may include modifying play section information included in the second header based on the modification information of the media file to be edited.

According to an example embodiment, the extracting of the metadata of the second header may include changing the first header to exclude the first header from a file parsing process.

According to an example embodiment, the method may further include determining a media file to be transmitted. According to an example embodiment, the determining of the media file to be transmitted may include determining whether the second header is present in the media file by analyzing the media file, and determining whether to include the first header in the media file to be transmitted based on a signal indicating whether to remove the first header, when the second header is present.

According to an example embodiment, the determining of the media file to be transmitted may include changing data included in the first header to a predetermined value, when the first header is to be removed.

According to an example embodiment, the determining of the media file to be transmitted may include determining a media file including the first header, the second header, and the media data, to be the media file to be transmitted for sharing editing history information, when the first header is not to be removed.

According to an example embodiment, the determining of the media file to be transmitted may include removing, from the media data, at least one portion of the media samples corresponding to a play section removed based on the modification information, and determining a media file including the media data from which the at least one portion of the media samples is removed, to be the media file to be transmitted.

According to an example embodiment, the method may further include restoring a media file, wherein the restoring of the media file may include receiving restoration information of the media file, identifying the location of the first header based on location information of the first header included in the second header, converting the first header into a file parsable form, and removing the second header based on whether to maintain the editing history information of the media file.

FIG. 2 is a block diagram of a media file editing module according to an example embodiment.

FIG. 2 illustrates a media file editing module 200, an input unit 210 including input circuitry, an information display 230, a media file analyzer 250, a header modifier 270, and a file sharer 290.

According to an example embodiment, the media file editing module 200 may include the input unit 210, the information display 230, the media file analyzer 250, the header modifier 270, and the file sharer 290. For example, the media file editing module 200 may be implemented in the form of software, stored in a memory (e.g., a memory 930 of FIG. 9), and executed by a processor (e.g., the processor 920 of FIG. 9). In an example embodiment, the operation of the media file editing module 200 and/or components included in the media file editing module 200 may be construed as the operation of the processor 920. For example, the processor 920 may perform an operation according to an example embodiment using the components included in the media file editing module 200.

In an example embodiment, a portion of the components of the media file editing module may be omitted, or another component may be added, and various embodiments of the present disclosure are not limited thereto.

According to an example embodiment, a header may include metadata. According to an example embodiment, the metadata may include at least one of a created time, an edited time, a capturing location, capturing device information, attribute information, track information, or play section information of the media file. The metadata may include first metadata related to a media data acquisition path and/or second metadata related to media data play. For example, the first metadata may include at least one of a created time, an edited time, a capturing location, capturing device information, attribute information, and/or track information of the media file. Further, for example, the second metadata may include play section information (e.g., a play frame, a play time).

According to an example embodiment, the input unit 210 may receive a media file to be edited, selected by a user, first metadata information to be modified, and/or second metadata information to be modified. The processor 920 may receive the media file to be edited, selected by the user through the input unit 210, the first metadata information to be modified, and/or the second metadata information to be modified.

According to an example embodiment, the information display 230 may display the first metadata and/or the second metadata. The processor 920 may display the first metadata and/or the second metadata through a display using the information display 230.

According to an example embodiment, the media file analyzer 250 may recognize a format of the media file, and identify the locations of the elements such as the header and the media data region by analyzing a file structure according to the specification of each file format. Further, the media file analyzer 250 may identify the location (e.g., offset) of data to be changed according to modification information being input. According to an example embodiment, the processor 920 may identify the location of a header and the location of media data and identify the location of data to be changed, using the media file analyzer 250.

According to an example embodiment, the header modifier 270 may add a new header (e.g., a second header) by copying an existing header (e.g., a first header). In addition, the processor 920 may modify and store metadata included in the header corresponding to data to be modified, using the header modifier 270. According to an example embodiment, the processor 920 may store a location (e.g., offset) value of the existing header (e.g., a first header) in a second header for restoration to data included in the existing header, using the header modifier 270.

According to an example embodiment, the processor 920 may change the existing header (e.g., the first header) to a form negligible in a file parsing process, using the header modifier 270. For example, the processor 920 may change the first header to a free space so that the first header may be ignored in the file parsing process. According to an example embodiment, in a media file restoration process, the processor 920 may change again the existing header (e.g., the first header) to a form valid for the file parsing process, using the header modifier 270. For example, the processor 920 may change the first header that is being a free space to a moov box, thereby changing the first header to a form valid for the file parsing process. According to an example embodiment, the processor 920 may also perform an operation of changing the data of the existing header to an insignificant value in a media file sharing process, using the header modifier 270. Various embodiments of a method of sharing a media file will be described below in detail with reference to FIG. 7.

Figure 9:
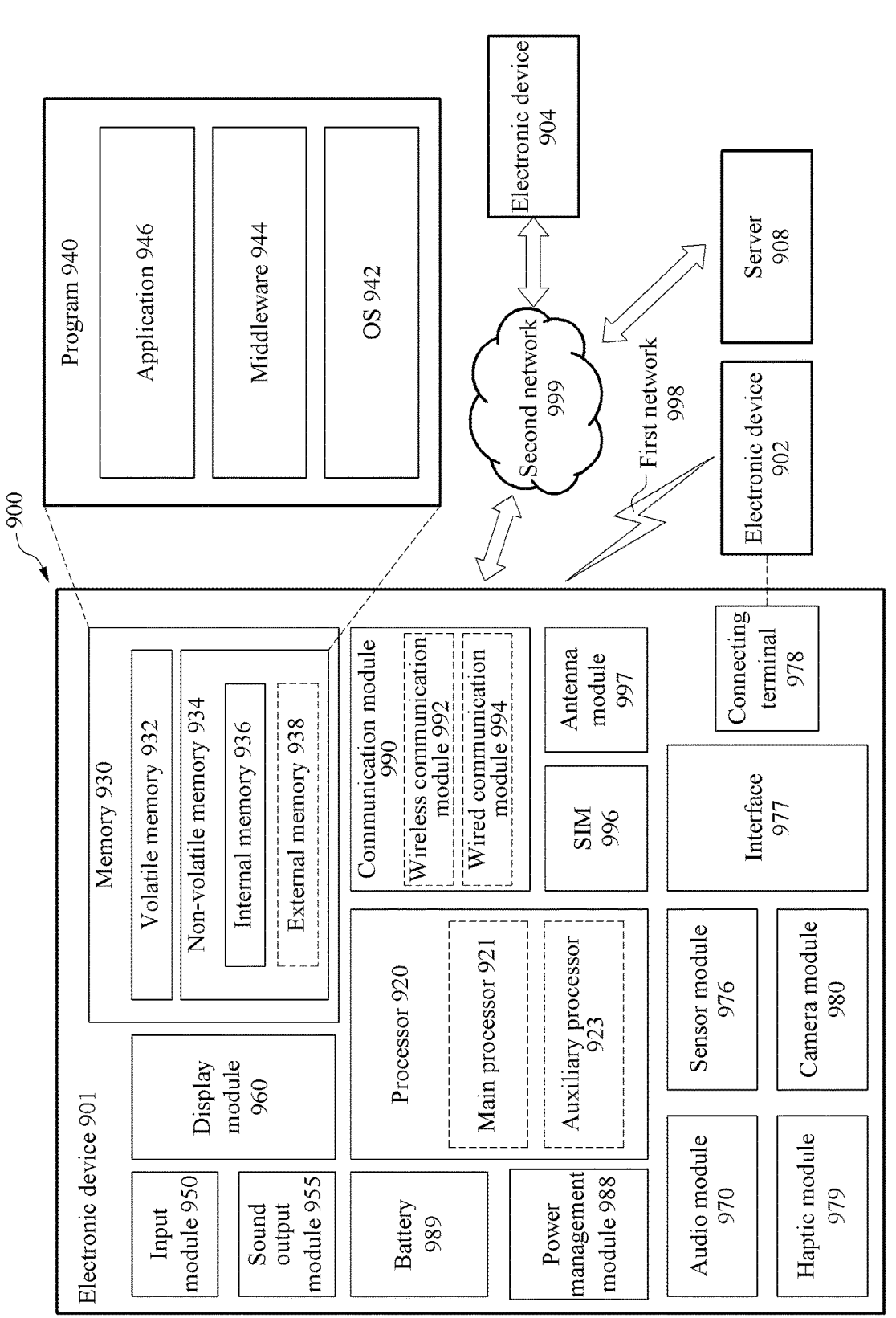
FIG. 9 is a block diagram illustrating an electronic device in a network environment according to an example embodiment.

According to an example embodiment, when a stored media file is shared with another electronic device or uploaded to a server, the file sharer 290 may change the data of the existing header (e.g., the first header) to an insignificant value through the header modifier 270 and then transmit the media file through a communication module 990 comprising communication circuitry (e.g., see communication module 990 in FIG. 9). According to an example embodiment, the processor 920 may transmit the file to the server and/or the another electronic device while maintaining the data of the existing header using the file sharer 290, when the user desires to preserve the data of the existing header (e.g., the first header). Each "module" herein may include circuitry.

Figure 3:
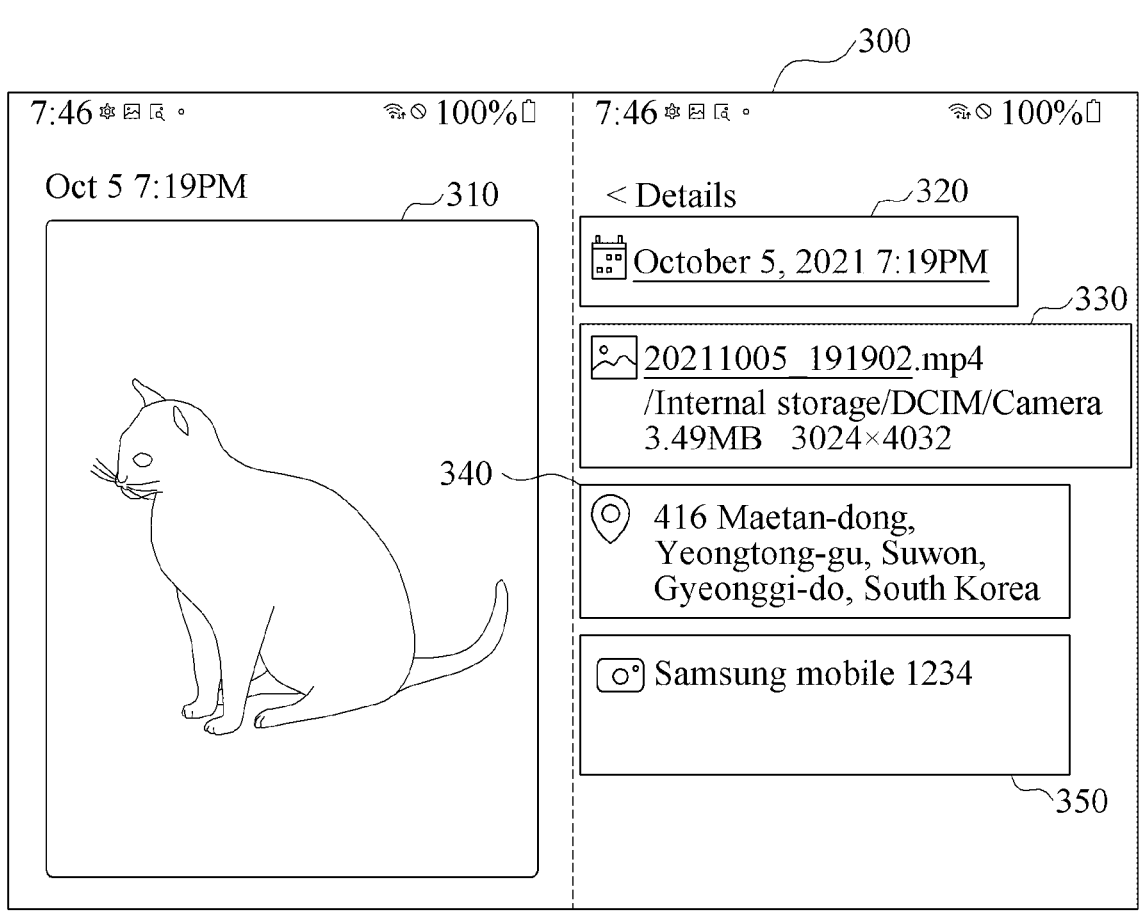
FIG. 3 is a diagram illustrating a media file information display screen according to an example embodiment.

FIG. 3 is a diagram illustrating a media file information display screen according to an example embodiment.

FIG. 3 illustrates a media file information display screen 300, a video 310, a created time 320, a capturing location 340, storage location information 330, and capturing device information 350.

According to an example embodiment, information related to the video 310, which is a media file, may be displayed on the media file information display screen 300. According to an example embodiment, the information related to the video 310 may include first metadata. The first metadata may include the created time 320, an edited time, the capturing location 340, the capturing device information 350, attribute information, and/or track information of the media file.

According to an example embodiment, the created time 320 may be a time at which the media file was created. For example, the created time 320 may be a time at which the video 310 was recorded. In FIG. 3, the time at which the video 310 was recorded may be "2021.10.05, 7:19 pm".

According to an example embodiment, the edited time may be a time related to the edition of the media file. For example, the edited time may include a time at which the edition started, a time used for the edition, and/or a time at which the edition was completed. For example, when the time at which the video 310 was created is "2021.10.05, 7:19 pm", and the time at which a user completed the edition of the video 310 is "2021.10.17, 2:23 pm", the edited time may be "2021.10.17, 2:23 pm".

According to an example embodiment, the capturing location 340 may be the location at which the media file was created. For example, the capturing location 340 may be a place where the video 310 was recorded. In FIG. 3, the location where the video 310 was recorded may be "416 Maetan-dong, Yeongtong-gu, Suwon, Gyeonggi-do, South Korea".

According to an example embodiment, the attribute information of the media file may include information related to the attributes of the media file. For example, the attribute information of the media file may include rotation information and/or color information.

According to an example embodiment, the track information may include information related to a track included in the media file. According to an example embodiment, the track may be a logical structure including media samples and a description of the media samples. According to an example embodiment, the track information may include track identification information, a track created time, a track modified time, and/or codec information required for decoding.

According to an example embodiment, the storage location information 330 may include information related to the location at which the video 310 is stored in the memory 930 (e.g., the memory 930 of FIG. 9) included in the electronic device 901. For example, as shown in FIG. 3, the information related to the location (or file path) at which the video 310 is stored in the memory 930 may be "/internal storage/ DCIM/Camera". According to an example embodiment, the storage location information 330 may include information related to the location at which the video 310 is stored in a server.

According to an example embodiment, the capturing device information 350 may include information related to the electronic device 901 used to acquire the media file. According to an example embodiment, the capturing device information 350 may include a model name, circumstance information (e.g., brightness and time) at the time of capturing, physical specification information (e.g., lens information) of the capturing device, and/or capturing device setting information (e.g., aperture, focus, whether to use flash, and zoom) of the capturing device. For example, as shown in FIG. 3, the capturing device information 350, which is information related to an electronic device used to record the video 310, may include a model name of the electronic device, such as "Samsung mobile 1234".

According to an example embodiment, media file size information may include information related to the size of the media file. For example, the size information of the video 310 may be "3.49 MB".

Examples of the media file information display screen 300 according to various embodiments of the present disclosure are not limited to the example shown in FIG. 3. For example, the layout of the media file information display screen 300 and/or the types of elements included therein may differ.

Figure 4:
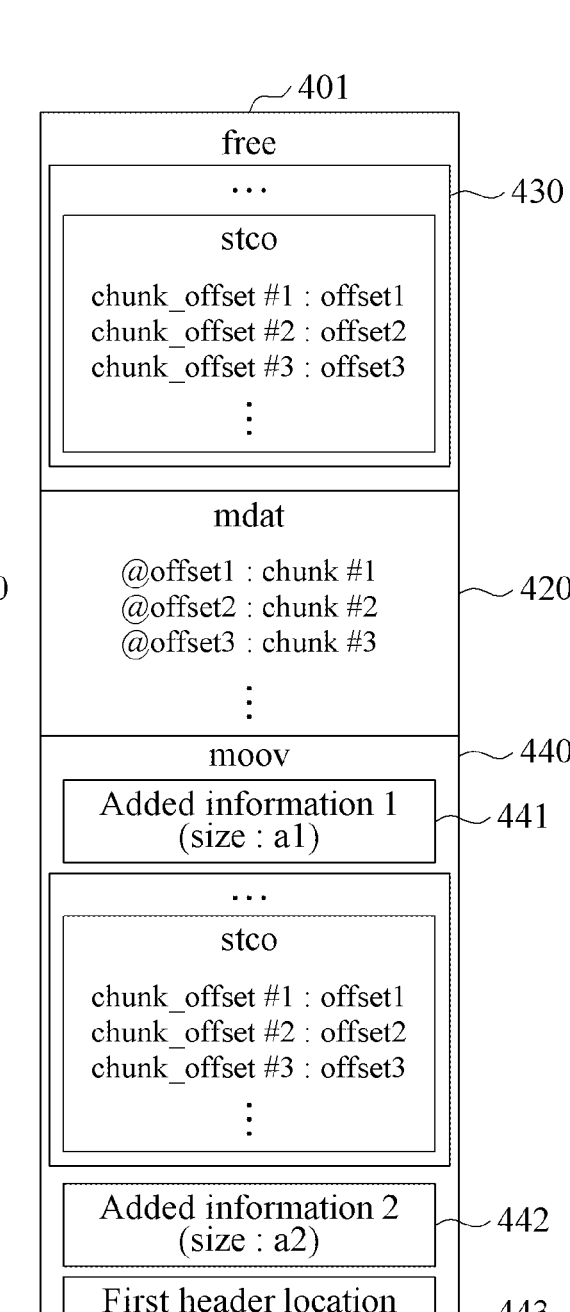
FIG. 4 is a diagram illustrating a process of editing metadata of a media file according to an example embodiment.

FIG. 4 is a diagram illustrating a process of editing metadata of a media file according to an example embodiment.

FIG. 4 illustrates an original media file 400, a modified media file 401, a first header 410 of the original media file, offset information 411 corresponding to media samples, media data 420, a first header 430 of the modified media file, a second header 440, added information 441 and 442, and first header location information 443.

According to an example embodiment, FIG. 4 is a diagram illustrating a process of modifying first metadata related to the video 310, which is a media file, shown in FIG. 3. The first metadata related to the video 310 shown in FIG. 3 may be included in the first header 410 of the original media file shown in FIG. 4. Further, the media data related to the video 310 may be included in the media data 420 shown in FIG. 4.

According to an example embodiment, the processor 920 (e.g., the processor 920 of FIG. 9) may modify at least one of a created time, an edited time, a capturing location, capturing device information, attribute information, or track information of the media file included in the second header 440 based on modification information of the media file to be edited. For example, when the created time of the video 310 is incorrect, a user may arbitrarily modify the created time, and the processor 920 may modify the created time of the video 310 included in the first metadata based on the modification information that is based on an input of the user. As another example, when the information related to the capturing device used to record the video 310 is stored as Device B although it is actually Device A, the user may modify the information to Device A. The processor 920 may modify the capturing device information included in the first metadata from Device B to Device A based on the modification information that is based on the input of the user.

According to an example embodiment, the original media file 400 may be included in the media file to be edited. The original media file 400 may include a video file before the modification. According to an example embodiment, the modified media file 401 may include a media file obtained by modifying the original media file 400 based on the modification information. According to an example embodiment, the first header 410 of the original media file may include an existing header included in the original media file. According to an example embodiment, the offset information 411 corresponding to the media samples may be included in the first header 410 of the original media file. According to an example embodiment, the offset information 411 corresponding to the media samples may include information related to the respective locations at which one or more media samples included in the media data are stored in a storage space. According to an example embodiment, the storage space may include a memory (e.g., the memory 930 of FIG. 9). For example, when the media file is an ISOBMFF file, the offset information 411 corresponding to the media samples may be a sample to chunk offset box (stco) included in the moov box. "chunk_offset #1: offset1" in stco may indicate that "a data chunk 1 may be stored from a point away from a start address by an offset 1 in the media data". Through this, the processor 920 may identify data chunks (or media samples) from the media data 420 using the information included in stco.

According to an example embodiment, the offset may be a number indicating a displacement difference from a start address of an object to a given specific point within an array or data structure object.

According to an example embodiment, the media data 420 may be a mdat box when the media file is an ISOBMFF file. According to an example embodiment, the media data 420 may include one or more data chunks (or media samples). For example, the data chunk 1 may be stored at a location away from the start address by the offset 1. As another example, a data chunk 2 may be stored at a location away from the start address by an offset 2. According to an example embodiment, the first header 430 of the modified media file may be a header obtained by changing the first header 410 of the original media file to a free space. For example, the processor 920 may change the first header 410 of the original media file to a free space to prevent, or reduce the likelihood of, the first header 410 of the original media file from being parsed. Through this, the first header 430 of the modified media file may not be parsed in a file parsing process. As shown in FIG. 4, the first header may be changed to a free space. According to an example embodiment, changing the header to a free space by the processor 920 may include changing the header so that corresponding data (or box) may not be recognized as a header. For example, changing the header to a free space may be changing the header not to be recognized as a header using a udta box, a non-existing box, a free box, and/or a skip box.

According to an example embodiment, the second header 440 may include a header newly added to the media file. According to an example embodiment, the second header 440 may be a moov box when the media file is an ISOBMFF file. According to an example embodiment, the processor 920 may generate the second header 440 by copying the first header 410 of the original media file. According to an example embodiment, the processor 920 may modify only the second header 440 based on the modification information and maintain the first header as it is without modification. For example, the processor 920 may add additional information to the second header 440 based on the modification information. The processor 920 may add the added information 1 441 and the added information 2 442 to the second header 440 based on the modification information. Through this, the processor 920 may add the added information 1 441 and the added information 2 442 to the second header 440 without relocating the media data 420.

According to an example embodiment, the second header 440 may include offset information (e.g., stco) corresponding to the media samples. The offset information corresponding to the media samples included in the second header 440 may be the same as the offset information 411 corresponding to the media samples included in the first header 410 of the original media file. According to an example embodiment, the offset information corresponding to the media samples included in the second header 440 may include information obtained by modifying the offset information 411 corresponding to the media samples included in the first header 410 of the original media file based on the modification information.

According to an example embodiment, the first header location information 443 may include information related to the location of the first header 430 of the modified media file. According to an example embodiment, to generate editing history information, the processor 920 may need to access the first header 430 of the modified media file. According to an example embodiment, to restore the media file, the processor 920 may need to access the first header 430 of the modified media file. Accordingly, the processor 920 may access the first header 430 using the first header location information 443 included in the second header 440.

Figure 5:
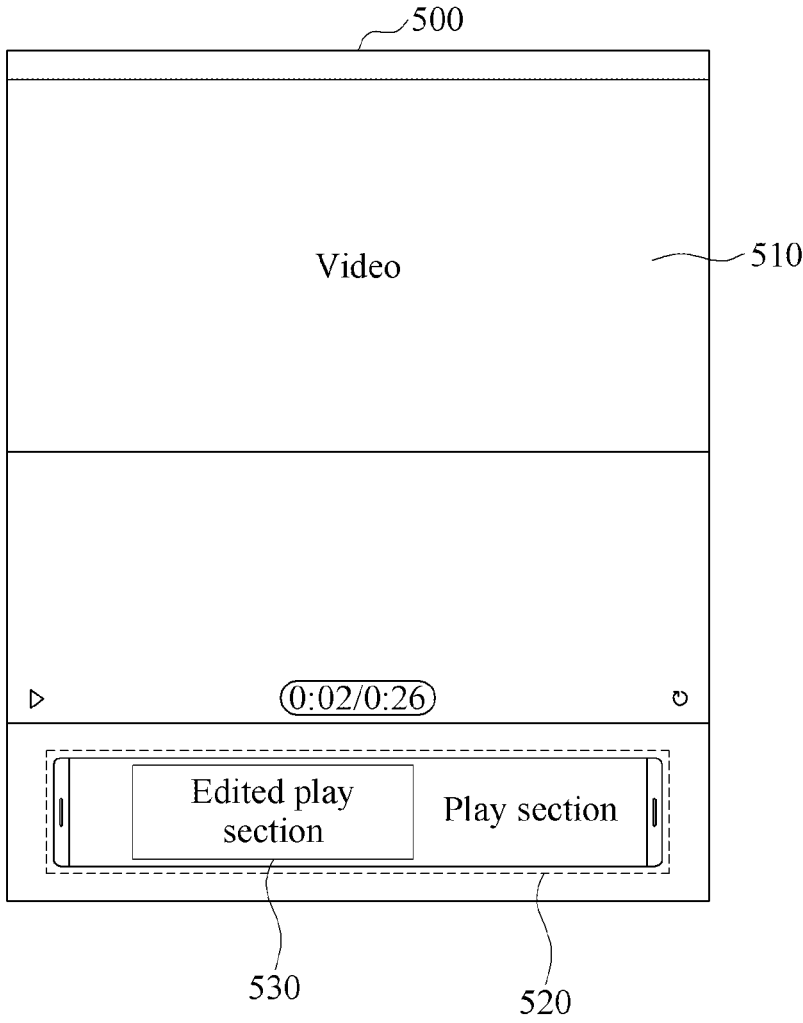
FIG. 5 is a diagram illustrating a video play section editing screen according to an example embodiment.

FIG. 5 is a diagram illustrating a video play section editing screen according to an example embodiment.

FIG. 5 illustrates a video play section editing screen 500, a video 510, a play section 520, and an edited play section 530.

According to an example embodiment, the video play section editing screen 500 may include a screen for editing a video in a video editing application. According to an example embodiment, the video 510 may be one of media files to be edited. A user may select the video 510 to be edited, and in this case, the video 510 may be included in the media file to be edited. According to an example embodiment, the play section 520 may include a play section in which frames included in the video 510 are displayed by a predetermined criterion. For example, the play section 520 may include a play section in which a plurality of frames included in the video 510 are displayed. In this case, of the plurality of frames included in the video 510, only key frames may be displayed on the screen. According to an example embodiment, the key frames may include a frame that is between a start frame and an end frame and most significant as having entire information. According to an example embodiment, the key frames may include a frame that is among at least a portion of the plurality of frames and most significant as having entire information.

According to an example embodiment, the edited play section 530 may include at least a portion of the play section 520. The processor 920 may receive an input signal of a user, select at least a portion of the play section 520, and generate the edited play section 530. For example, the play section 520 of the video 510 may be from 0 minutes to 10 minutes. The input signal of the user may include an edition signal for generating a video between 2 minutes and 7 minutes. In this case, the processor 920 may generate a video including the edited play section 530 between 2 minutes and 7 minutes.

According to an example embodiment, the processor 920 (e.g., the processor 920 of FIG. 9) may generate a video including the edited play section 530 between 2 minutes and 7 minutes, while modifying only the header of the media file and not modifying the media data. Various embodiments of a method of changing a media file according to video editing will be described below in detail with reference to FIG. 6.

Examples of the video play section editing screen 500 according to various embodiments of the present disclosure are not limited to the example shown in FIG. 5. For example, the layout of the video play section editing screen 500 and/or the types of elements included therein may differ.

Figure 6:
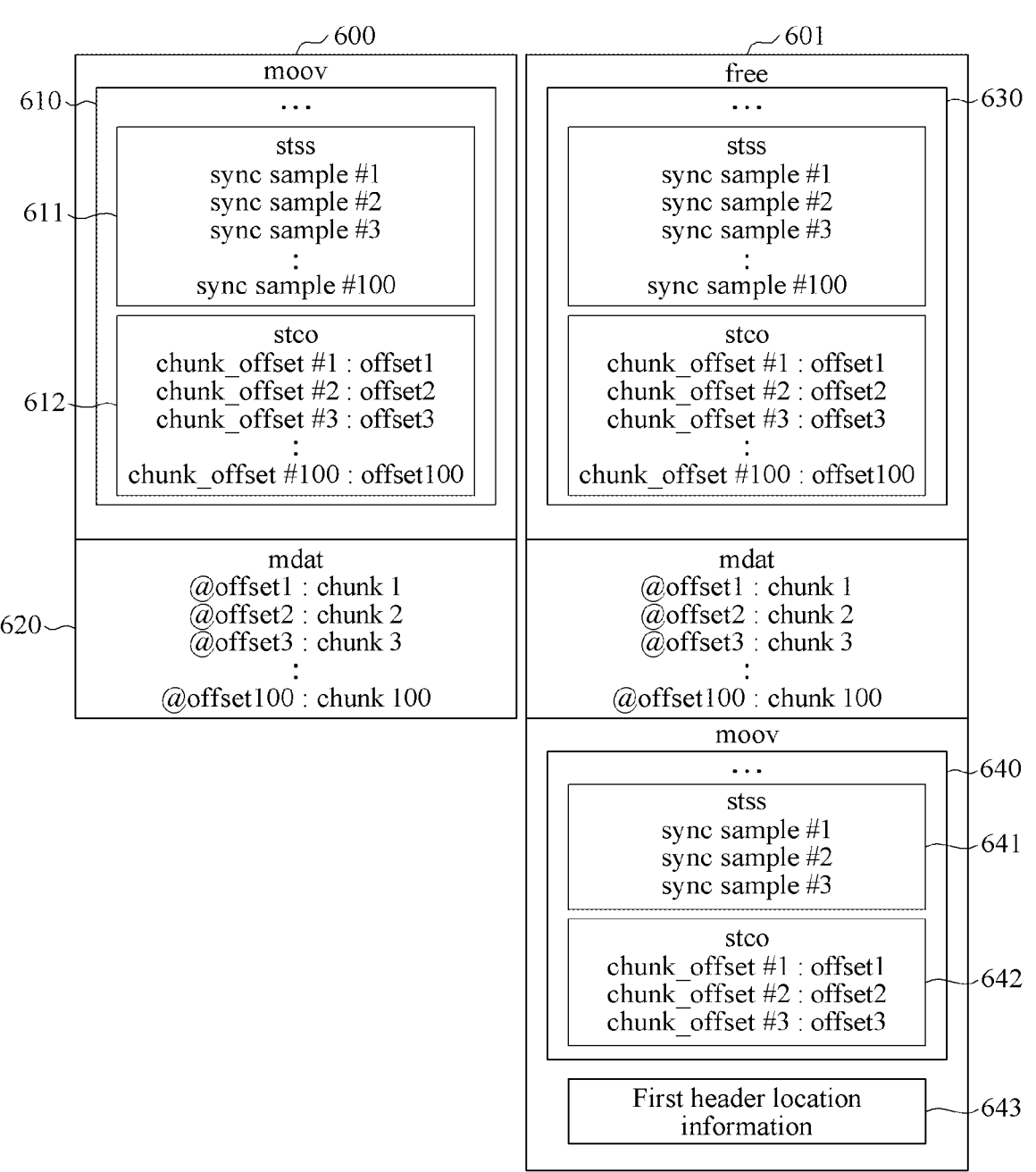
FIG. 6 is a diagram illustrating a video file editing process according to an example embodiment.

FIG. 6 is a diagram illustrating a video file editing process according to an example embodiment.

FIG. 6 illustrates an original video file 600, a modified video file 601, a first header 610 of the original video file, key frame information 611, offset information 612 corresponding to media samples, media data 620, a first header 630 of the modified video file, a second header 640, modified key frame information 641, offset information 642 corresponding to modified media samples, and first header location information 643. According to an example embodiment, a video file may be one of media files.

According to an example embodiment, FIG. 6 is a diagram illustrating a process of modifying second metadata related to the video 510 shown in FIG. 5. The second metadata related to the video 510 may include play section information corresponding to the play section 520. Further, the media data related to the video 510 may be included in the media data 620 shown in FIG. 6.

According to an example embodiment, the processor 920 (e.g., the processor 920 of FIG. 9) may modify play section information included in the second header based on modification information of the media file to be edited. For example, the play section of the video 510 may be from 0 minutes to 10 minutes, and the modification information may include information for modifying to a video including only a play section between 2 minutes and 7 minutes. Since the second header is obtained by copying the first header at first, the second header may include the metadata related to the video including the play section between 0 minutes and 10 minutes. The processor 920 may modify second metadata included in the second header to a play section between 2 minutes and 7 minutes based on the modification information. In this case, when the processor 920 parses the second header and plays the media file, the video between 2 minutes and 7 minutes may be played.

According to an example embodiment, the original video file 600 may be included in the media file to be edited. The original video file 600 may include a video file before the modification.

According to an example embodiment, the modified video file 601 may include a media file obtained by modifying the original video file 600 based on the modification information. It is noted that "based on" as used herein covers based at least on.

According to an example embodiment, the first header 610 of the original video file may include an existing header included in the original video file 600.

According to an example embodiment, the key frame information 611 may include information on key frames respectively referenced by one or more media samples included in the media data 620. According to an example embodiment, the key frame information 611 may be sync samples (stss) when the media file is an ISOBMFF file. For example, the key frame information 611 may include frame numbers of the key frames referenced by the media samples in the form of a table.

According to an example embodiment, the offset information 612 corresponding to the media samples may include information related to the respective locations at which the one or more media samples included in the media data are stored.

According to an example embodiment, the media data 620 may include one or more media samples necessary for playing the video 510.

According to an example embodiment, the first header 630 of the modified video file may be a header obtained by changing the first header 610 of the original video file to a free space.

According to an example embodiment, the second header 640 may include a header newly added to the video file.

According to an example embodiment, the modified key frame information 641 may include key frame information modified based on the modification information. For example, the original video may include a key frame 1 to a key frame 10. Based on the modification information, the processor 920 may maintain only the key frame 1 to the key frame 3 and delete the key frame 4 to the key frame 10. In this case, the modified key frame information 641 may include information on the key frame 1 (e.g., #sync sample 1 of FIG. 6), information on the key frame 2 (e.g., #sync sample 2 of FIG. 6), and information on the key frame 3 (e.g., #sync sample 3 of FIG. 6).

According to an example embodiment, the offset information 642 corresponding to the modified media samples may include offset information corresponding to the key media samples modified based on the modification information. For example, the offset information 642 corresponding to the modified media samples may include an offset 1 (chunk_offset #1) of a data chunk 1, an offset 2 (chunk_offset #2) of a data chunk 2, and an offset 3 (chunk_offset #3) of a data chunk 3, as shown in FIG. 6.

According to an example embodiment, the first header location information 643 may include information related to the location of the first header 630 of the modified video file. According to an example embodiment, the video 510 may be a video including a play section of 0 seconds to 100 seconds.

The key frame information 611 may include information on key frames respectively corresponding to 1-second-long media samples. For example, when the video 510 includes a play section of 0 seconds to 100 seconds, there may be 100 key frames. In this case, the modification information may include information for modifying the video with the play section of 0 seconds to 100 seconds to a video with a play section of 0 seconds to 3 seconds. The processor 920 may modify the key frame information 611 included in the first header 610 of the original video file and the offset information 612 corresponding to the media samples based on the modification information. The processor 920 may generate a second header by copying the first header 610 of the original video file. The generated second header may include the key frame information 611 included in the first header 610 of the original video file and the offset information 612 corresponding to the media samples as it is. For the modification to the video with the play section of 0 seconds to 3 seconds, the processor 920 may generate the modified key frame information 641 by maintaining only a key frame 1, a key frame 2, and a key frame 3 among the plurality of key frames and deleting the other key frames. In addition, the processor 920 may generate the offset information 642 corresponding to the modified media samples by maintaining only a data chunk 1 (or a media sample 1), a data chunk 2 (or a media sample 2), and a data chunk 3 (or a media sample 3) and deleting the other data chunks, among a plurality of offset information. In this case, the key frame 1 may correspond to the data chunk 1, the key frame 2 may correspond to the data chunk 2, and the key frame 3 may correspond to the data chunk 3. Through this, the second header 640 may include the modified key frame information 641 and the offset information 642 corresponding to the modified media samples. The processor 920 may parse the second header 640 and play the video between 0 seconds and 3 seconds.

Figure 7:
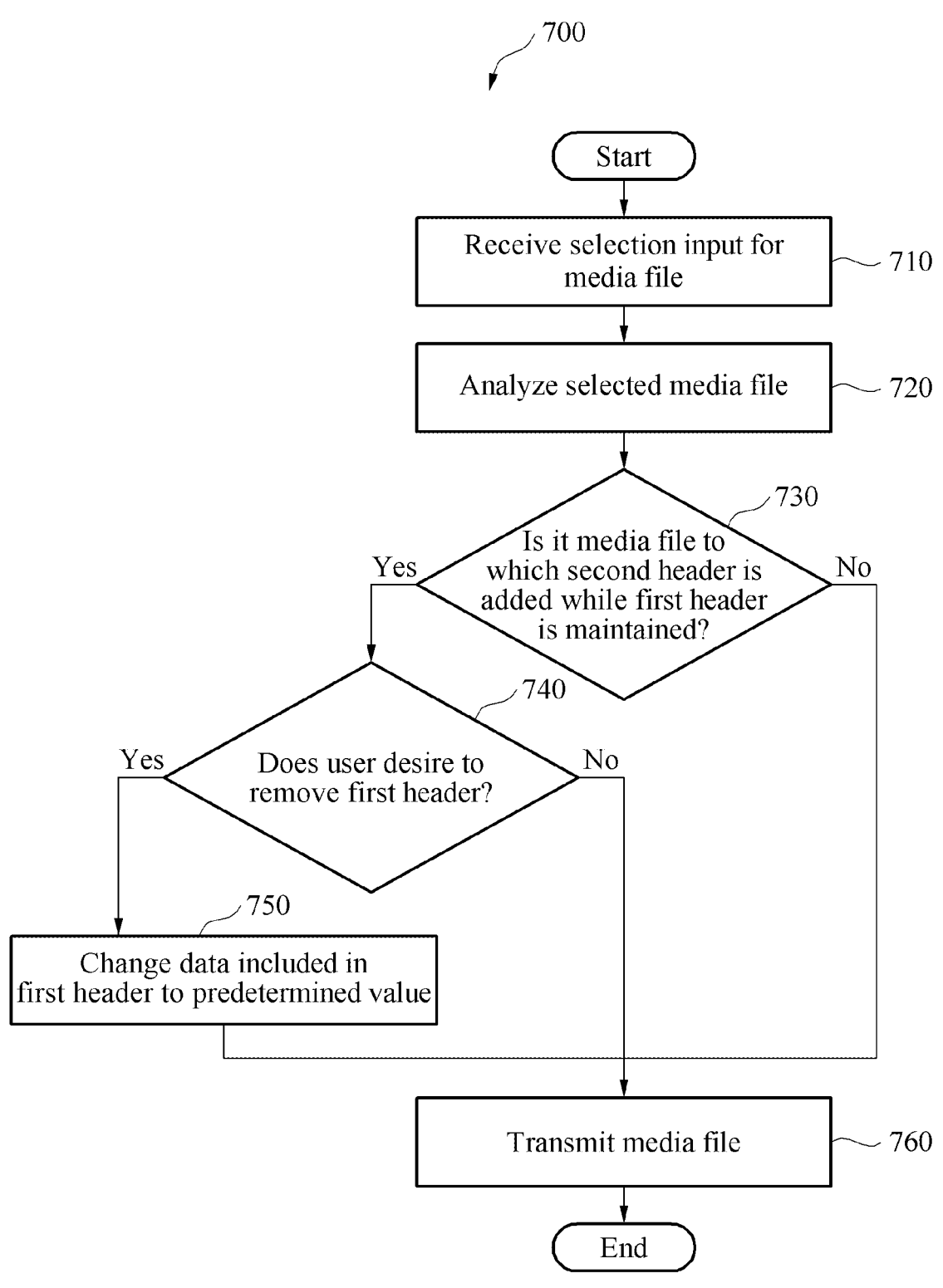
FIG. 7 is a flowchart illustrating a method of sharing a media file according to an example embodiment.

FIG. 7 is a flowchart 700 illustrating a method of sharing a media file according to an example embodiment.

According to an example embodiment, a processor (e.g., the processor 920 of FIG. 9) may determine a media file to be transmitted. According to an example embodiment, the media file to be transmitted may be a media file that is shared with another electronic device and/or a server. The processor 920 may receive a selection input for a portion of a plurality of media files from a user, in operation 710. When the processor 920 receives a selection input signal for a media file that the user desires to share, the processor 920 may determine a media file to be transmitted by performing data processing on the media file.

According to an example embodiment, the processor 920 may analyze the selected media file, in operation 720. According to an example embodiment, the processor 920 may analyze a structure of the media file by analyzing the selected media file. The processor 920 may identify the location of a header and/or media data included in the media file by analyzing the structure of the selected media file. In addition, the processor 920 may identify the location of data to be modified within the media file by analyzing the structure of the media file.

According to an example embodiment, the processor 920 may determine whether a second header is present in the media file by analyzing the media file. According to an example embodiment, the processor 920 may determine whether it is a media file to which the second header is added while the first header is maintained, in operation 730. According to an example embodiment, when it is a media file to which the second header is added (if yes in operation 730), the processor 920 may determine the media file to be transmitted based on whether to remove the first header. According to an example embodiment, the processor 920 may determine whether the user desires to remove the first header based on the selection input signal of the user, in operation 740. The processor 920 may receive a selection input signal regarding whether to remove the first header from the user. According to an example embodiment, when the first header is present, editing history information may be included in the media file to be transmitted. For example, the electronic device and/or the server receiving the media file may know a state of the media file before edition using metadata included in the first header. For example, when the first header is present in the media file to be transmitted, the electronic device and/or the server may extract editing history information using information included in the first header. Accordingly, the user may need to decide whether to include the editing history information in the media file to be shared according to his or her selection. Sharing editing history information with another user may cause a situation in which privacy is not protected and personal information is exposed. Thus, the user may be allowed to determine whether to include the first header (or the editing history information) in the media file.

According to an example embodiment, when it is a media file to which the second header is not added, the media file may include a media file that has never been modified. In this case (if no in operation 730 in FIG. 7), the processor 920 may determine the corresponding media file to be the media file to be transmitted, and transmit the media file to another electronic device, in operation 760.

According to an example embodiment, when the user desires to remove the first header (if yes in operation 740), the processor 920 may change data included in the first header to a predetermined value, in operation 750. According to an example embodiment, the processor 920 may change the data included in the first header to an insignificant value. For example, the processor 920 may change all the data included in the first header to "0". Accordingly, the first header included in the media file to be transmitted may be changed to the predetermined value.

According to an example embodiment, when the user does not desire to remove the first header (if no in operation 740), the processor 920 may determine the media file to be transmitted without changing the first header. For example, the media file to be transmitted may include the first header, the second header, and the media file. In this case, the user may desire to share the editing history information with another user. According to an example embodiment, the editing history information may include log data obtained by modifying the media file. Accordingly, the processor 920 may return the media file to be transmitted to the media file before the edition using the editing history information. The electronic device receiving the media file to be transmitted may display the editing history information through a display and furthermore, play the media file before the edition using the editing history information. For example, the original video may include a play section of 0 minutes to 100 minutes, and the edited video may include a play section of 0 minutes to 3 minutes. The electronic device receiving the media file to be transmitted may play the original video including the play section of 0 minutes to 100 minutes as well as the edited video including the play section of 0 minutes to 3 minutes.

According to an example embodiment, when the media file is a video, the edited video may include only data of at least a portion of the original video. For example, the original video may be a video including a play section of 0 minutes to 100 minutes. In addition, the edited video may be a video including a play section of 0 minutes to 3 minutes. The method of editing a media file described above may include a method of maintaining the media data and modifying only the header by the processor 920 based on the modification information. In the case of maintaining the media data, the media file to be transferred may be very large. Accordingly, to improve the transmission efficiency, the processor 920 may remove, from the media data, at least one portion of media samples corresponding to the play section removed based on the modification information. For example, the removed play section may include a play section of 4 minutes to 100 minutes. The processor 920 may remove the media samples respectively corresponding the play section of 4 minutes to 100 minutes from the media data. Accordingly, the media data may include only the media samples respectively corresponding to the play section of 0 minutes to 3 minutes. According to an example embodiment, the processor 920 may determine a media file including the media data from which the at least one portion of the media samples is removed, to be the media file to be transmitted. In this case, the media file to be transmitted may have a relatively small size compared to the original media file, which may improve the transmission efficiency.

According to an example embodiment, when the media file to be transmitted is determined, the processor 920 may transmit the media file to another electronic device and/or a server, in operation 760.

Figure 8:
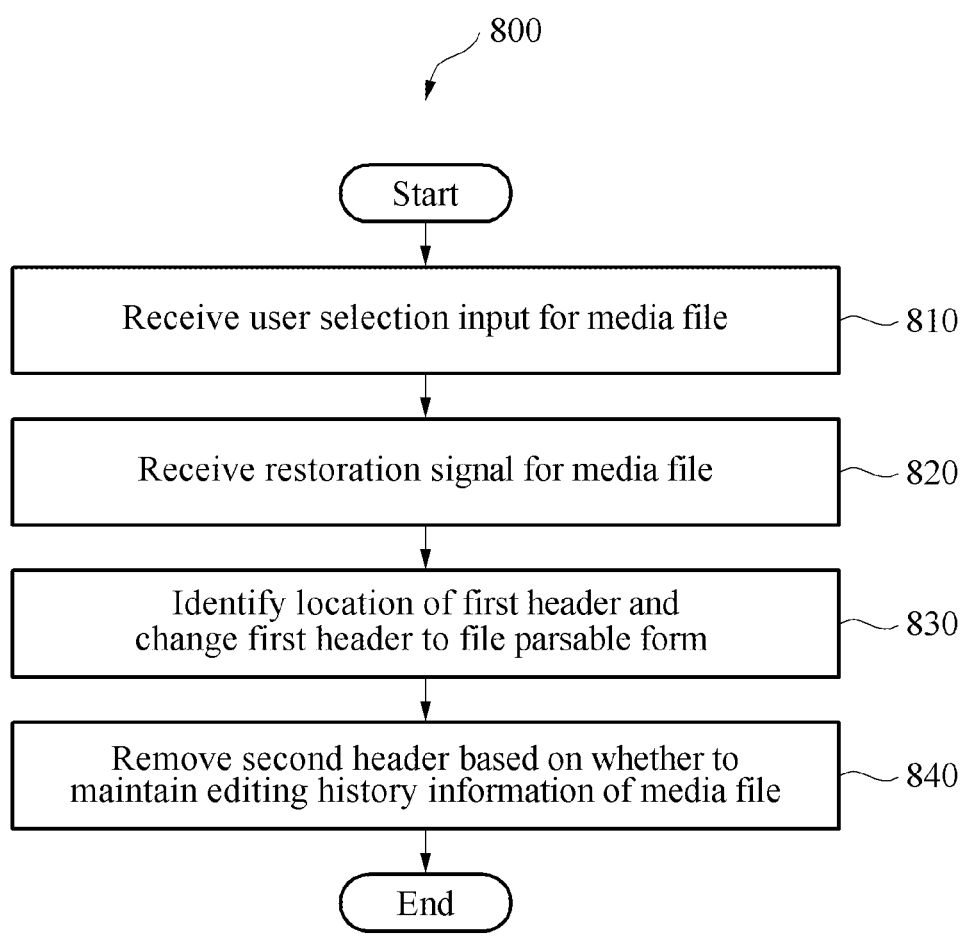
FIG. 8 is a flowchart illustrating a method of restoring a media file according to an example embodiment.

FIG. 8 is a flowchart 800 illustrating a method of restoring a media file according to an example embodiment.

According to an example embodiment, a processor (e.g., the processor 920 of FIG. 9) may restore a media file.

According to an example embodiment, the processor 920 may receive a user selection input for a media file, in operation 810. The user may select a media file to be restored. According to an example embodiment, the processor 920 may receive a restoration signal for the media file, in operation 820. According to an example embodiment, the processor 920 may receive restoration information of the media file. According to an example embodiment, the restoration information may include information related to the restoration of the media file. The restoration information may include, for example, at least a portion of information about a restoration point in time desired by a user, information about a file to be restored, and/or location information of data included in the file to be restored.

According to an example embodiment, the processor 920 may identify the location of the first header and change the first header to a file parsable form, in operation 830. According to an example embodiment, the processor 920 may identify the location of the first header based on location information of the first header included in the second header. Describing with reference to FIG. 6, the processor 920 may identify the location of the first header in the storage space using the first header location information 643 included in the second header 640. The processor 920 may convert the identified first header into the file parsable form. Through this, the processor 920 may extract the metadata included in the first header by parsing the first header.

According to an example embodiment, the processor 920 may remove the second header based on whether to maintain the editing history information of the media file, in operation 840. According to an example embodiment, the editing history information may include log data obtained by modifying the media file. Accordingly, the processor 920 may return the media file to be transmitted to the media file before the edition using the editing history information.

According to an example embodiment, the user selection input may be a selection input of not maintaining the editing history information of the media file. In this case, the processor 920 may remove the second header. According to an example embodiment, the user selection input may be a selection input of maintaining the editing history information of the media file. In this case, the processor 920 may maintain the second header, rather than removing the second header. However, the processor 920 may have to extract the metadata from the first header and thus, may need to prevent, or reduce the likelihood of, or reduce the likelihood of, the second header from being parsed in a file parsing process. Accordingly, the processor 920 may change the second header to a free space while maintaining the data included in the second header, thereby preventing, or reducing the likelihood of, the second header from being parsed in the file parsing process. Each "processor" herein comprises processing circuitry.

FIG. 9 is a block diagram illustrating an electronic device in a network environment according to an example embodiment an example embodiment.

FIG. 9 is a block diagram illustrating an electronic device 901 in a network environment 900 according to an example embodiment. Referring to FIG. 9, the electronic device 901 in the network environment 900 may communicate with an external electronic device 902 via a first network 998 (e.g., a short-range wireless communication network), and/or communicate with at least one of an external electronic device 904 or a server 908 via a second network 999 (e.g., a long-range wireless communication network). According to an example embodiment, the electronic device 901 may communicate with the electronic device 904 via the server 908. According to an example embodiment, the electronic device 901 may include a processor 920, a memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some example embodiments, at least one of the components (e.g., the connecting terminal 978) may be omitted from the electronic device 901, or one or more other components may be added to the electronic device 901. In some example embodiments, some of the components (e.g., the sensor module 976, the camera module 980, or the antenna module 997) may be integrated as a single component (e.g., the display module 960).

The processor 920, comprising processing circuitry, may execute, for example, software (e.g., a program 940) to control at least one other component (e.g., a hardware or software component) of the electronic device 901 connected to the processor 920, and may perform various data processing or computation. According to an example embodiment, as at least a part of data processing or computation, the processor 920 may store a command or data received from another component (e.g., the sensor module 976 or the communication module 990) in a volatile memory 932, process the command or the data stored in the volatile memory 932, and store resulting data in a non-volatile memory 934. According to an example embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with the main processor 921. For example, when the electronic device 901 includes the main processor 921 and the auxiliary processor 923, the auxiliary processor 923 may be adapted to consume less power than the main processor 921 or to be specific to a specified function. The auxiliary processor 923 may be implemented separately from the main processor 921 or as a portion of the main processor 921.

The auxiliary processor 923 may control at least some of functions or states related to at least one (e.g., the display module 960, the sensor module 976, or the communication module 990) of the components of the electronic device 901, instead of the main processor 921 while the main processor 921 is in an inactive (e.g., sleep) state or along with the main processor 921 while the main processor 921 is in an active state (e.g., executing an application). According to an example embodiment, the auxiliary processor 923 (e.g., an ISP or a CP) may be implemented as a portion of another component (e.g., the camera module 980 or the communication module 990) that is functionally related to the auxiliary processor 923. According to an example embodiment, the auxiliary processor 923 (e.g., an NPU) may include a hardware structure specified for artificial intelligence model processing. An artificial intelligence model may be generated by machine learning. Such learning may be performed by, for example, the electronic device 901 in which an artificial intelligence model is executed, or performed via a separate server (e.g., the server 908). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934. The non-volatile memory 934 may include an internal memory 936 and an external memory 938.

The program 940 may be stored as software in the memory 930, and may include, for example, an operating system (OS) 942, middleware 944, or an application 946.

The input module 950, comprising input circuitry, may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output a sound signal to the outside of the electronic device 901. The sound output module 955 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 960, including a display, may visually provide information to the outside (e.g., a user) of the electronic device 901. The display module 960 may include, for example, a control circuit for controlling a display, a hologram device, or a projector and control circuitry to control a corresponding one of the display, the hologram device, and the projector. According to an example embodiment, the display module 960 may include a touch sensor adapted to detect a touch, or a pressure sensor adapted to measure the intensity of force incurred by the touch.

The audio module 970 may convert a sound into an electrical signal or vice versa. According to an example embodiment, the audio module 970 may obtain the sound via the input module 950 or output the sound via the sound output module 955 or an external electronic device (e.g., the electronic device 902 such as a speaker or a headphone) directly or wirelessly connected to the electronic device 901.

The sensor module 976 may detect an operational state (e.g., power or temperature) of the electronic device 901 or an environmental state (e.g., a state of a user) external to the electronic device 901, and generate an electrical signal or data value corresponding to the detected state. According to an example embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an example embodiment, the interface 977 may include, for example, a high-definition multimedia interface (HDMI), a universal serial bus (USB) interface, a secure digital (SD) card interface, or an audio interface.

The connecting terminal 978 may include a connector via which the electronic device 901 may be physically connected to an external electronic device (e.g., the electronic device 902). According to an example embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via his or her tactile sensation or kinesthetic sensation. According to an example embodiment, the haptic module 979 may include, for example, a motor, a piezoelectric element, or an electric stimulator.

The camera module 980 may take a still image and a video. According to an example embodiment, the camera module 980 may include one or more lenses, image sensors, image signal processors, or flashes.

The power management module 988 may manage power supplied to the electronic device 901. According to an example embodiment, the power management module 988 may be implemented as, for example, at least a part of a power management integrated circuit (PMIC).

The battery 989 may supply power to at least one component of the electronic device 901. According to an example embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that operate independently of the processor 920 (e.g., an application processor) and support direct (e.g., wired) communication or wireless communication. According to an example embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module, or a power line communication (PLC) module). A corresponding one of these communication modules may communicate with the external electronic device 904 via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the SIM 996.

The wireless communication module 992 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., a mmWave band) to achieve, e.g., a high data transmission rate. The wireless communication module 992 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 992 may support various requirements specified in the electronic device 901, an external electronic device (e.g., the electronic device 904), or a network system (e.g., the second network 999). According to an example embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an example embodiment, the antenna module 997 may include an antenna including a radiating element including a conductive material or a conductive pattern formed in or on a substrate (e.g., a printed circuit board (PCB)). According to an example embodiment, the antenna module 997 may include a plurality of antennas (e.g., array antennas). In such a case, at least one antenna appropriate for a communication scheme used in a communication network, such as the first network 998 or the second network 999, may be selected by, for example, the communication module 990 from the plurality of antennas. The signal or the power may be transmitted or received between the communication module 990 and the external electronic device via the at least one selected antenna. According to an example embodiment, another component (e.g., a radio frequency integrated circuit (RFIC)) other than the radiating element may be additionally formed as a part of the antenna module 997.

According to an example embodiment, the antenna module 997 may form a mmWave antenna module. According to an example embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 901 and the external electronic device 904 via the server 908 coupled with the second network 999. Each of the external electronic devices 902 or 904 may be a device of the same type as or a different type from the electronic device 901. According to an example embodiment, all or some of operations to be executed by the electronic device 901 may be executed at one or more of the external electronic devices 902 and 904, and the server 908. For example, if the electronic device 901 needs to perform a function or a service automatically, or in response to a request from a user or another device, the electronic device 901, instead of, or in addition to, executing the function or the service, may request one or more external electronic devices to perform at least portion of the function or the service. The one or more external electronic devices receiving the request may perform the at least portion of the function or the service requested, or an additional function or an additional service related to the request, and may transfer an outcome of the performing to the electronic device 901. The electronic device 901 may provide the outcome, with or without further processing of the outcome, as at least portion of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another example embodiment, the external electronic device 904 may include an Internet-of-things (IoT) device. The server 908 may be an intelligent server using machine learning and/or a neural network. According to an example embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

What is claimed is:

1. An electronic device, comprising:
at least one processor comprising processing circuitry; and
a memory configured to store instructions which, when executed by the at least one processor, cause the at least one processor to:
identify a first header and a media data from a media file to be edited, wherein the first header comprises metadata and wherein the media data comprises at least one media sample,
generate a second header based on the first header by copying at least a portion of the first header,
modify the second header based on modification information, and
while maintaining a location of the media data unchanged:
determine a location of the second header to be after the media data when a location of the first header is before the location of the media data, and
determine the location of the second header based on the location of the first header when the location of the first header is after the location of the media data,
wherein an offset information corresponding to the media samples included in the second header is the same as an offset information corresponding to the media samples included in the first header,
determine whether to include the first header in a media file to be transmitted based on a signal indicating whether to remove the first header,
remove, from the media data, at least one portion of the at least one media sample corresponding to a play section removed based on the modification information, and
determine a media file comprising the media data from which the at least one portion of the at least one media sample is removed, to be the media file to be transmitted.

2. The electronic device of claim 1, wherein the modification information of the media file to be edited comprises at least one of modification information of the metadata or modification information of the media data.

3. The electronic device of claim 1, wherein the metadata comprises at least one of a created time, an edited time, a capturing location, capturing device information, attribute information, track information, or play section information of the media file.

4. The electronic device of claim 1, wherein the processor is configured to modify at least one of a created time, an edited time, a capturing location, capturing device information, attribute information, or track information of the media file included in the second header based on the modification information of the media file to be edited.

5. The electronic device of claim 1, wherein the processor is configured to modify play section information included in the second header based on the modification information of the media file to be edited.

6. The electronic device of claim 1, wherein the processor is configured to change the first header to exclude the first header from a file parsing process.

7. The electronic device of claim 1, wherein the processor is configured to:
receive restoration information of the media file, identify the location of the first header based on location information of the first header included in the second header,
convert the first header into a file parsable form, and
remove the second header based on whether to maintain the editing history information of the media file.

8. An electronic device, comprising:
at least one processor comprising processing circuitry; and
a memory configured to store instructions which, when executed by the at least one processor, cause the at least one processor to:
identify a first header and a media data from a media file to be edited, wherein the first header comprises metadata and wherein the media data comprises at least one media sample,
generate a second header based on the first header by copying at least a portion of the first header,
modify the second header based on modification information,
determine a location of the second header to be after the media data when a location of the first header is before a location of the media data,
determine the location of the second header based on the location of the first header when the location of the first header is after the location of the media data,
determine whether to change the first header in a media file to be transmitted to a free space by using a skip box to prevent the first header from being parsed,
remove, from the media data, at least one portion of the at least one media sample corresponding to a play section removed based on the modification information, and
determine a media file comprising the media data from which the at least one portion of the at least one media sample is removed, to be the media file to be transmitted,
wherein metadata of the second header, not the metadata of the first header, is extracted in a media file information extraction process.

9. The electronic device of claim 8, wherein the processor is configured to change data included in the first header to a predetermined value, when the first header is to be removed.

10. The electronic device of claim 8, wherein the processor is configured to determine a media file comprising the first header, the second header, and the media data, to be the media file to be transmitted for sharing editing history information, at least when the first header is not to be removed.

11. A method of editing a media file, the method comprising:
identifying a first header and a media data from a media file to be edited, wherein the first header comprises metadata and wherein the media data comprises at least one media sample;
generating a second header based on the first header by copying at least a portion of the first header;
modifying the second header based on modification information; and
while maintaining a location of the media data unchanged:
determining a location of the second header to be after the media data when a location of the first header is before the location of the media data; and
determining the location of the second header based on the location of the first header when the location of the first header is after the location of the media data, wherein an offset information corresponding to the media samples included in the second header is the same as an offset information corresponding to the media samples included in the first header, determining whether to include the first header in a media file to be transmitted based on a signal indicating whether to remove the first header, removing, from the media data, at least one portion of the at least one media sample corresponding to a play section removed based on the modification information, determining a media file comprising the media data from which the at least one portion of the at least one media sample is removed, to be the media file to be transmitted.

12. The method of claim 11, wherein the modification information of the media file to be edited comprises at least one of modification information of the metadata or modification information of the media data.

13. The method of claim 11, wherein the metadata comprises at least one of a created time, an edited time, a capturing location, capturing device information, attribute information, track information, or play section information of the media file.

14. The method of claim 11, wherein the modifying of the second header comprises modifying at least one of a created time, an edited time, a capturing location, capturing device information, attribute information, or track information of the media file included in the second header based on the modification information of the media file to be edited.

15. The method of claim 11, wherein the modifying of the second header comprises modifying play section information included in the second header based on the modification information of the media file to be edited.

16. The method of claim 11, wherein the extracting of the metadata of the second header comprises changing the first header to exclude the first header.

17. The method of claim 11,
wherein the determining of the media file to be transmitted comprises:

determining whether the second header is present in the media file by analyzing the media file; and determining whether to change the first header in the media file to be transmitted to a free space by using a skip box to prevent the first header from being parsed.

18. The method of claim 17, wherein the determining of the media file to be transmitted comprises changing data included in the first header to a predetermined value, when the first header is to be removed.

19. The method of claim 17, wherein the determining of the media file to be transmitted comprises determining a media file comprising the first header, the second header, and the media data, to be the media file to be transmitted for sharing editing history information, when the first header is not to be removed.

20. The method of claim 11, further comprising:
restoring a media file,
wherein the restoring of the media file comprises:
receiving restoration information of the media file;
identifying the location of the first header based on location information of the first header included in the second header;

converting the first header into a file parsable form; and removing the second header based on whether to maintain the editing history information of the media file.

21. A non-transitory computer-readable storage medium storing instructions that, when executed by a processor, cause the processor to perform the method of claim 11.

* * * * *